(12) United States Patent
Esseghir et al.

(10) Patent No.: US 9,670,345 B2
(45) Date of Patent: Jun. 6, 2017

(54) OPTICAL FIBER CABLE COMPONENTS

(71) Applicant: Dow Global Technologies LLC, Midland, MI (US)

(72) Inventors: Mohamed Esseghir, Collegeville, PA (US); Gangwei Sun, Shanghai (CN); Jeffrey M. Cogen, Flemington, NJ (US); Gary R. Marchand, Gonzalez, LA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/917,502

(22) PCT Filed: Oct. 18, 2013

(86) PCT No.: PCT/CN2013/085476
§ 371 (c)(1),
(2) Date: Mar. 8, 2016

(87) PCT Pub. No.: WO2015/054893
PCT Pub. Date: Apr. 23, 2015

(65) Prior Publication Data
US 2016/0215130 A1    Jul. 28, 2016

(51) Int. Cl.
| | | |
|---|---|---|
| C08L 23/12 | (2006.01) |
| C08L 51/06 | (2006.01) |
| C08L 23/14 | (2006.01) |
| G02B 6/44 | (2006.01) |

(52) U.S. Cl.
CPC ............ *C08L 23/12* (2013.01); *C08L 23/142* (2013.01); *C08L 51/06* (2013.01); *G02B 6/443* (2013.01); *C08L 2201/08* (2013.01); *C08L 2203/12* (2013.01); *C08L 2205/06* (2013.01); *C08L 2205/24* (2013.01); *G02B 6/4407* (2013.01); *G02B 6/4479* (2013.01)

(58) Field of Classification Search
CPC ................................. C08L 23/12; C08L 51/06
See application file for complete search history.

(56) References Cited

U.S. PATENT DOCUMENTS

| | | |
|---|---|---|
| 5,138,683 A | 8/1992 | Oestreich et al. |
| 5,574,816 A | 11/1996 | Yang et al. |
| 5,741,858 A | 4/1998 | Brann et al. |
| 5,911,023 A | 6/1999 | Risch et al. |
| 6,041,153 A | 3/2000 | Yang |
| 6,185,349 B1 | 2/2001 | Dammert et al. |
| 6,215,931 B1 | 4/2001 | Risch et al. |
| 6,411,403 B1 | 6/2002 | Siddhamalli |
| 6,483,971 B2 | 11/2002 | Gaillard et al. |
| 6,658,184 B2 | 12/2003 | Bourget et al. |
| 6,707,973 B2 | 3/2004 | Witt et al. |
| 6,915,052 B2 | 7/2005 | Boogh |
| 6,992,226 B2 | 1/2006 | Fischer et al. |
| 7,011,774 B2 | 3/2006 | Risch |
| 7,466,887 B2 | 12/2008 | Castellani et al. |
| 7,801,404 B2 | 9/2010 | Pavan et al. |
| 7,947,793 B2 | 5/2011 | Marchand et al. |
| 8,273,826 B2 | 9/2012 | Walton et al. |
| 8,346,040 B2 | 1/2013 | Testu et al. |
| 8,385,705 B2 | 2/2013 | Overton et al. |
| 8,476,366 B2 | 7/2013 | Walton et al. |
| 2001/0012557 A1* | 8/2001 | Willham ................. B32B 27/36 428/215 |
| 2005/0265673 A1 | 12/2005 | Mumm et al. |
| 2006/0045439 A1* | 3/2006 | Brown ................... G02B 6/443 385/100 |
| 2010/0113698 A1 | 5/2010 | Walton et al. |
| 2011/0082249 A1 | 4/2011 | Shan et al. |
| 2011/0082257 A1 | 4/2011 | Carnahan et al. |
| 2011/0313106 A1 | 12/2011 | Shan et al. |
| 2011/0313107 A1 | 12/2011 | Shan et al. |
| 2011/0313108 A1 | 12/2011 | Shan et al. |
| 2012/0208946 A1 | 8/2012 | Shan et al. |
| 2012/0208961 A1 | 8/2012 | Carnahan et al. |

FOREIGN PATENT DOCUMENTS

| | | |
|---|---|---|
| CN | 1911996 A | 2/2007 |
| WO | 98/02489 A1 | 1/1998 |

OTHER PUBLICATIONS

Premphet, K. and Paecharoenchai E. "Polypropylene/metallocene ethylene-octene copolymer blends with a bimodal particle size distribution: Mechanical properties and their controlling factors"; Journal of Applied Polymer Science, vol. 85, Issue 11, pp. 2412-2418.
PCT/CN2013/085476, International Search Report and Written Opinion with a mailing date of Jun. 30, 2014.
PCT/CN2013/085476, International Preliminary Report on Patentability with a mailing date of Apr. 19, 2016.

\* cited by examiner

*Primary Examiner* — Robert Harlan (57) ABSTRACT

Optical cable components fabricated from an extrudable polymeric blend of crystalline polypropylene modified with one or more impact-modifying polymers. The impact-modifying polymers are crosslinked and can be selected from a polyolefin elastomer, an olefin multi-block interpolymer, an olefin block composite, and combinations thereof. Optionally, the polymeric blend can further comprise a compatibilizer. The polymeric blend may also contain one or more additives. The optical fiber cable components can be selected from buffer tubes, core tubes, and slotted core tubes.

10 Claims, 2 Drawing Sheets

OPTICAL FIBER CABLE COMPONENTS

FIELD

Various embodiments of the present invention relate to buffer-tube, core-tube, or slotted-core fiber optic cable components made from an extrudable blend of crystalline polypropylene modified with one or more crosslinked or crosslinkable impact-modifying polymers.

INTRODUCTION

Optical fibers efficiently transmit information at high rates and over long distances. These fibers are delicate and need to be protected. In practical application, a fiber optic cable protects the fibers from mechanical damage and/or adverse environmental conditions such as moisture exposure. For example, specific protective components include extruded buffer tubes, core tubes, and slotted core members.

Buffer tubes, also known as loose buffer tubes, are protection components used to house and protect optical fibers, such as in a cable. Typically, these loose buffer tubes are filled with a hydrocarbon gel or grease to suspend and protect the fiber from moisture and have stringent requirements for high crush resistance, resistance to micro-bending, low brittleness temperature, good grease compatibility, impact resistance, and low post-extrusion shrinkage. Materials used in the manufacture of the buffer tubes include polybutylene terephthalate ("PBT"), high-crystallinity polypropylene, and to a lesser extent high-density polyethylene. PBT is a high-cost material, and cost-effective alternatives are desired.

SUMMARY

One embodiment is an extruded optical cable protective component comprising: an extruded polymeric blend, comprising:
(a) a crystalline polypropylene having a crystallinity of at least 55 percent; and
(b) a crosslinked impact-modifying polymer,
wherein said crosslinked impact-modifying polymer is an elastomer selected from the group consisting of a crosslinked silane-functionalized elastomer, a crosslinked maleic-anhydride-functionalized elastomer, or combinations thereof.

Another embodiment is a polymeric blend, comprising:
(a) a crystalline polypropylene having a crystallinity of at least about 55 percent;
(b) an impact-modifying polymer selected from the group consisting of a silane-grafted polyolefin elastomer, a silane-grafted olefin multi-block interpolymer, a silane-grafted olefin block composite, and combinations of two or more thereof;
(c) a non-silane-grafted elastomer selected from the group consisting of an olefin multi-block interpolymer, an olefin block composite, and combinations thereof; and
(d) a condensation catalyst.

BRIEF DESCRIPTION OF THE DRAWINGS

Reference is made to the accompanying drawings in which.

DETAILED DESCRIPTION

Various embodiments of the present invention concern polymeric blends comprising a crystalline polypropylene with a crosslinked impact-modifying polymer. The polymeric blend can optionally further comprise a non-crosslinked compatibilizer. The polymeric blend may also contain one or more additives. Such polymeric blends can be extruded to form optical fiber cable protective components.

Crystalline Polypropylene

The crystalline polypropylene suitable for use in various embodiments can be either isotactic or syndiotactic homopolymer polypropylene. In one or more embodiments, the crystalline polypropylene can be an isotactic homopolymer polypropylene, in order to maximize the crystallinity of the polymer. "Polymer" means a macromolecular compound prepared by reacting (i.e., polymerizing) monomers of the same or different type. "Polymer" includes homopolymers and interpolymers. As used herein, "homopolymer" denotes a polymer comprising repeating units derived from a single monomer type, but does not exclude residual amounts of other components used in preparing the homopolymer, such as chain transfer agents.

The polypropylene used in the present invention is well known in the literature and can be prepared by known techniques. In general, the polypropylene can be made with Ziegler-Natta catalysts or metallocene catalysts. "Kirk-Othmer Encyclopedia of Chemical Technology" (2001) describes these catalysts and their corresponding reactor processes for making crystalline polypropylenes.

The crystallinity of the polypropylene is measured by differential scanning calorimetry ("DSC"). In this measurement, a small sample of the propylene polymer is sealed into an aluminum DSC pan. The sample is placed into a DSC cell with a 25-centimeter-per-minute nitrogen purge and cooled to about −100° C. A standard thermal history is established for the sample by heating at 10° C. per minute to 225° C. The sample then is re-cooled to about −100° C. and reheated at 10° C. per minute to 225° C. The observed heat of fusion ($\Delta H_{observed}$) for the second scan is recorded. The observed heat of fusion is related to the degree of crystallinity in weight percent based on the weight of the polypropylene sample by the following equation:

$$\text{Crystallinity percent} = (\Delta H_{observed})/(\Delta H_{isotactic\ pp}) \times 100$$

where the heat of fusion for isotactic polypropylene ($\Delta H_{isotactic\ pp}$) is reported in B. Wunderlich, Macromolecular Physics, Volume 3, Crystal Melting, Academic Press, New York, 1960, p 48, as 165 Joules per gram (J/g) of polymer. In various embodiments, the crystalline polypropylene can have a crystallinity of at least 55 weight percent, at least 65 weight percent, at least 70 weight percent, or at least 73 weight percent. U.S. Pat. No. 7,087,680, filed Oct. 7, 2003, discloses an example of a high crystalline polypropylene useful in various embodiments of the present invention.

In one or more embodiments, the crystalline polypropylene can have a melt index ($I_2$) ranging from 1 to 20 grams per 10 minutes ("g/10 min."), from 1 to 12 g/10 min., from 2 to 9 g/10 min., from 2 to 8 g/10 min., or from 3 to 6 g/10 min. Melt indices provided herein are determined according to ASTM method D1238. Unless otherwise noted, melt indices are determined at 190° C. and 2.16 Kg (i.e., $I_2$).

In various embodiments, the crystalline polypropylene can be present in the polymeric blend in an amount ranging from 45 to 95 weight percent ("wt %"), from 55 to 90 wt %, from 60 to 90 wt %, or from 70 to 90 wt % based on the total polymeric blend weight.

In various embodiments, a nucleating agent can be employed with the crystalline polypropylene. Examples of suitable nucleating agents include ADK NA-11 and ADK NA-21, which are available commercially from Asahi Denim Kokai. Other examples include the nucleating agents described in U.S. Pat. Nos. 3,367,926 and 5,574,816. Persons of ordinary skill in the art can readily identify other useful nucleating agents. The nucleating agents are typically incorporated into the crystalline polypropylene at levels of at least 500 ppm, at least 650 ppm, or at least 750 ppm.

Crosslinked Impact-Modifying Polymer

As noted above, the polymeric blend comprises a crosslinked impact-modifying polymer. As used herein, an "impact-modifying polymer" is a polymer that modifies various properties of the above-described crystalline polypropylene. For example, the impact-modifying polymer can modify the crystalline polypropylene to enable it to absorb mechanical energy without fracture, thereby imparting sufficient impact toughness for fiber optic cable applications.

In one or more embodiments, the crosslinked impact-modifying polymer is an elastomer. The crosslinked elastomer can be prepared from any known or hereafter discovered elastomer, such as an olefin elastomer, an olefin multi-block interpolymer, an olefin block composite, or combinations of two or more thereof. Such elastomer components may be crosslinked using known crosslinking techniques, such as silane crosslinking and maleic anhydride/amination crosslinking. In various embodiments, an impact-modifying polymer to be crosslinked (i.e., a "crosslinkable" impact-modifying polymer) can be combined first with the above-described crystalline polypropylene and any other desired components into the polymeric blend; thereafter, the impact-modifying polymer can be crosslinked in situ in the polymeric blend. Accordingly, preferred crosslinking methods are those that selectively crosslink the impact-modifying polymer while not crosslinking or otherwise adversely affecting other components of the polymeric blend, such as the crystalline polypropylene or other optional polymeric components. In various embodiments, the crosslinking method employed does not include peroxide-induced crosslinking.

As noted above, the impact-modifying polymer to be crosslinked can be an olefin elastomer. Olefin elastomers include both polyolefin homopolymers and interpolymers. These olefin elastomers exclude olefin multi-block interpolymer elastomers and olefin block composite elastomers, which are described below. Examples of polyolefin homopolymers are homopolymers of ethylene and propylene. Examples of the polyolefin interpolymers are ethylene/α-olefin interpolymers and propylene/α-olefin interpolymers. In such embodiments, the α-olefin can be a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky, but they are not olefin multi-block copolymers or olefin block composites, as described above.

Olefin elastomers can also comprise one or more functional groups such as an unsaturated ester or acid or silane, and these elastomers (polyolefins) are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids. One example of an unsaturated silane is vinyl trialkoxysilane.

Functional groups can also be included in the olefin elastomer through grafting which can be accomplished as is commonly known in the art. In one embodiment, grafting may occur by way of free radical functionalization which typically includes melt blending an olefin polymer, a free radical initiator (such as a peroxide or the like), and a compound containing a functional group. During melt blending, the free radical initiator reacts (reactive melt blending) with the olefin polymer to form polymer radicals. The compound containing a functional group bonds to the backbone of the polymer radicals to form a functionalized polymer. Exemplary compounds containing functional groups include but are not limited to alkoxysilanes (e.g., vinyl trimethoxysilane, vinyl triethoxysilane), and vinyl carboxylic acids and anhydrides (e.g., maleic anhydride).

More specific examples of the optional olefin elastomers useful in this invention include very-low-density polyethylene ("VLDPE") (e.g., FLEXOMER™ ethylene/1-hexene polyethylene made by The Dow Chemical Company), homogeneously branched, linear ethylene/α-olefin copolymers (e.g. TAFMER™ by Mitsui Petrochemicals Company Limited and EXACT™ by Exxon Chemical Company), and homogeneously branched, substantially linear ethylene/α-olefin polymers (e.g., AFFINITY™ and ENGAGE™ polyethylene available from The Dow Chemical Company).

Olefin elastomers can also include ethylene-propylene-diene monomer ("EPDM") elastomers and chlorinated polyethylenes ("CPE"). Commercial examples of suitable EPDMs include NORDEL™ EPDMs, available from The Dow Chemical Company. Commercial examples of suitable CPEs include TYRIN™ CPEs, available from The Dow Chemical Company.

The olefin elastomers useful herein also include propylene, butene, and other alkene-based copolymers, e.g., copolymers comprising a majority of units derived from propylene and a minority of units derived from another α-olefin (including ethylene). Exemplary propylene-based polymers useful herein include VERSIFY™ polymers available from The Dow Chemical Company, and VISTAMAXX™ polymers available from ExxonMobil Chemical Company.

Olefin elastomers, particularly ethylene elastomers, can have, before grafting, a density of less than 0.91 g/cm³ or less than 0.90 g/cm³. Olefin elastomers, particularly ethylene copolymers, suitable for use herein can have a density greater than 0.85 g/cm³ or greater than 0.86, g/cm³.

Olefin elastomers, particularly ethylene elastomers, can have, before grafting, a melt index ($I_2$) greater than 0.10 g/10 min., or greater than 1 g/10 min. Olefin elastomers, particularly ethylene elastomers, can have a melt index of less than 500 g/10 min. or less than 100 g/10 min.

As noted above, the impact-modifying polymer to be crosslinked can be an olefin multi-block interpolymer. An "olefin multi-block interpolymer" is a polymer comprising two or more chemically distinct regions or segments (referred to as "blocks") preferably joined in a linear manner, that is, a polymer comprising chemically differentiated units which are joined end-to-end with respect to polymerized olefinic, preferable ethylenic, functionality, rather than in pendent or grafted fashion. In various embodiments, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the multi-block interpolymers used in the practice of this invention are characterized by unique distributions of both polymer polydispersity (PDI or Mw/Mn or MWD), block length distribution, and/or block number distribution, due, in a preferred embodiment, to the effect of the shuttling agent(s) in combination with multiple catalysts used in their preparation. More specifically, when produced in a continuous process, the polymers can have a PDI from 1.4 to 3.5, from 1.5 to 2.5, from 1.6 to 2.5, or from 1.6 to 2.1. When produced in a batch or semi-batch process, the polymers can have a PDI from 1.4 to 2.9, from 1.4 to 2.5, from 1.4 to 2.0, or from 1.4 to 1.8.

In various embodiments, the olefin multi-block interpolymer can be an ethylene multi-block interpolymer. The term "ethylene multi-block interpolymer" means a multi-block interpolymer comprising ethylene and one or more interpolymerizable comonomers, in which ethylene constitutes a plurality of the polymerized monomer units of at least one block or segment in the polymer, and can constitute at least 90, at least 95, or at least 98 mole percent ("mol %") of the block. Based on total polymer weight, the ethylene multi-block interpolymers used herein can have an ethylene content from 25 to 97 mol %, from 40 to 96 mol %, from 55 to 95 mol %, or from 65 to 85 mol %. The comonomer or comonomers can constitute the remainder of the interpolymer. In one or more embodiments, the olefin multi-block interpolymer can be an olefin multi-block copolymer.

In some embodiments, the ethylene multi-block interpolymer can be represented by the following formula:

$$(AB)_n$$

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a linear fashion, not in a branched or a star fashion. "Hard" segments refer to blocks of polymerized units in which ethylene is present in an amount greater than 95 weight percent, and preferably greater than 98 weight percent. In other words, the comonomer content in the hard segments is less than 5 weight percent, and preferably less than 2 weight percent. In some embodiments, the hard segments comprise all or substantially all ethylene. "Soft" segments, on the other hand, refer to blocks of polymerized units of ethylene and an α-olefin comonomer in which the comonomer content is greater than 5 wt %, greater than 8 wt %, greater than 10 wt %, or greater than 15 wt %. In some embodiments, the comonomer content in the soft segments can be greater than 20 wt %, greater than 25 wt %, greater than 30 wt %, greater than 35 wt %, greater than 40 wt %, greater than 45 wt %, greater than 50 wt %, or greater than 60 wt %.

In some embodiments, A blocks and B blocks are randomly distributed along the polymer chain. In other words, the block interpolymers usually do not have a structure like:

AAA-AA-BBB-BB.

In other embodiments, the block interpolymers usually do not have a third type of block. In still other embodiments, each of block A and block B has monomers or comonomers randomly distributed within the block. In other words, neither block A nor block B comprises two or more segments (or sub-blocks) of distinct composition, such as a tip segment, which has a different composition than the rest of the block.

Because the respective distinguishable segments or blocks formed from two or more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In various embodiments, the quantity of extractable polymer using either a dialkyl ether or an alkane-solvent is less than 10, less than 7, less than 5, or less than 2 percent of the total polymer weight.

In some embodiments, the multi-block interpolymers possess a PDI fitting a Schultz-Flory distribution rather than a Poisson distribution. The interpolymers are further characterized as having both a polydisperse block distribution and a polydisperse distribution of block sizes and possessing a most probable distribution of block lengths. Preferred multi-block interpolymers are those containing 4 or more blocks or segments including terminal blocks. More preferably, the interpolymers include at least 5, 10 or 20 blocks or segments including terminal blocks.

In a further embodiment, the olefin multi-block interpolymers of the invention, especially those made in a continuous, solution polymerization reactor, possess a most probable distribution of block lengths. In one embodiment of this invention, the olefin multi-block interpolymers are defined as having an Mw/Mn from about 1.7 to about 3.5, and:

(A) At least one melting point, $T_m$, in degrees Celsius, and a density, d, in grams/cubic centimeter, where in the numerical values of $T_m$ and d correspond to the relationship:

$$T_m > -6553.3 + 13735(d) - 7051.7(d)^2; \text{ or}$$

(B) Is characterized by a heat of fusion, ΔH in J/g, and a delta quantity, ΔT, in degrees Celsius defined as the temperature difference between the tallest differential scanning calorimetry ("DSC") peak and the tallest crystallization analysis fractionation ("CRYSTAF")

peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T > 48° \text{ C. for } \Delta H \text{ greater than 130 J/g}$$

wherein the CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C.; or (C) Elastic recovery, Re, in percent at 300 percent strain and 1 cycle measured with a compression-molded film of the olefin multi-block interpolymer, and has a density, d, in grams/cubic centimeter, wherein the numerical values of Re and d satisfy the following relationship when the olefin multi-block interpolymer is substantially free of crosslinked phase:

$$Re > 1481 - 1629(d); \text{ or}$$

(D) Has a molecular weight fraction which elutes between 40° C. and 130° C. when fractionated using temperature rising elution fractionation ("TREF"), characterized in that the fraction has a molar comonomer content of at least 5 percent higher, or at least 10 percent higher, than that of a comparable random ethylene interpolymer fraction eluting between the same temperatures, wherein the comparable random ethylene interpolymer has the same comonomer(s) and has a melt index, density and molar comonomer content (based on the whole polymer) within 10 percent of that of the olefin multi-block interpolymer; or (E) Has a storage modulus at 25° C., G'(25° C.), and a storage modulus at 100° C., G'(100° C.), wherein the ratio of G'(25° C.) to G'(100° C.) is in the range of about 1:1 to about 9:1; or (F) Is characterized by an average block index greater than zero and up to about 1.

The olefin multi-block interpolymer may have one, some, all, or any combination of properties (A)-(F).

Suitable monomers for use in preparing the olefin multi-block interpolymers used in the practice of this invention include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4 octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

The olefin multi-block interpolymer may be modified by, for example, grafting, hydrogenation, nitrene insertion reactions, or other functionalization reactions such as those known to those skilled in the art. Preferred functionalizations are grafting reactions using a free-radical mechanism. A variety of radically graftable species may be attached to the polymer, either individually, or as relatively short grafts. These species include unsaturated molecules, each containing at least one heteroatom. These species include, but are not limited to, maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the respective esters, imides, salts, and Diels-Alder adducts of these compounds. These species also include silane compounds.

The olefin multi-block interpolymers can have a density of less than 0.90 g/cm³, less than 0.89 g/cm³, less than 0.885 g/cm³, less than 0.88 g/cm³, or less than 0.875 g/cm³. The olefin multi-block interpolymers can have a density of at least 0.85 g/cm³, at least 0.86, g/cm³, or at least 0.865 g/cm³. Density is measured by the procedure of ASTM D792.

The olefin multi-block interpolymers can have a melt index of at least 0.1 g/10 min., at least 0.2 g/10 min., or at least 0.3 g/10 min. In various embodiments, the olefin multi-block interpolymers can have a melt index of less than 20 g/10 min., less than 10 g/10 min., less than 7 g/10 min., or less than 1 g/10 min. In one or more embodiments, the olefin multi-block interpolymer can have a melt index ranging from 0.38 to 0.62 g/10 min.

The olefin multi-block interpolymers useful herein can have a 2% secant flexural modulus of less than 150 MPa, less than 100 MPa, less than 50 MPa, or less than 10 MPa, as measured according to ASTM method D790. The olefin multi-block interpolymers can have a 2% secant modulus of greater than zero.

The olefin multi-block interpolymers useful herein can have a melting point of less than 125° C., but greater than 60° C., greater than 70° C., greater than 80° C., greater than 90° C., greater than 100° C., or greater than 110° C. Melting point is measured by the differential scanning calorimetry ("DSC") method described in WO 2005/090427 (US2006/0199930).

The olefin multi-block interpolymers can have a weight-average molecular weight ("Mw") from 1,000 to 5,000,000 g/mol, from 1,000 to 1,000,000 g/mol, from 10,000 to 500,000 g/mol, or from 10,000 to 300,000 g/mol.

In one or more embodiments, the olefin multi-block interpolymer contains 10 to 40 wt %, 15 to 25 wt %, or 15 to 17 wt % of a hard segment. The hard segment is free of or contains less than 0.5 mol % units derived from comonomer. The olefin multi-block interpolymer also contains 60 to 90 wt %, or 75 to 85 wt %, or 83 wt % to 85 wt % of a soft segment. The content of alpha olefin in the soft block may range from 20 to 40 mol %, from 25 to 35 mol %, or from 23 to 30 mol %. In various embodiments the monomer can be ethylene and the comonomer can be butene or octene. In some embodiments, the comonomer is octene. Comonomer content is measured by nuclear magnetic resonance ("NMR") spectroscopy.

In various embodiments, the olefin multi-block interpolymer can be mesophase separated. As used herein, "mesophase separation" means a process in which polymeric blocks are locally segregated to form ordered domains. Crystallization of the ethylene segments in these systems is primarily constrained to the resulting mesodomains and such systems may be referred to as "mesophase separated." These mesodomains can take the form of spheres, cylinders, lamellae, or other morphologies known for block interpolymers. The narrowest dimension of a domain, such as perpendicular to the plane of lamellae, is generally greater than about 40 nm in the mesophase-separated olefin multi-block interpolymers of the present invention.

Domain sizes can be in the range of from 40 to 300 nm, from 50 to 250 nm, or from 60 to 200 nm, as measured by the smallest dimension such as perpendicular to the plane of lamellae or the diameter of spheres or cylinders. In addition, domains may have smallest dimensions that are greater than 60 nm, greater than 100 nm, and greater than 150 nm. Domains may be characterized as cylinders, spheres, lamellae, or other morphologies known for block interpolymers.

The mesophase-separated polymers comprise olefin multi-block interpolymers wherein the amount of comonomer in the soft segments as compared to that in the hard segments is such that the block interpolymer undergoes mesophase separation in the melt. The required amount of comonomer may be measured in mole percent and varies with each comonomer. A calculation may be made for any desired comonomer in order to determine the amount required to achieve mesophase separation. The minimum level of incompatibility, expressed as $\chi N$, to achieve mesophase separation in these polydisperse block interpolymers is predicted to be $\chi N=2.0$ (I. I. Potemkin, S. V. Panyukov, *Phys. Rev. E.* 57, 6902 (1998)). Recognizing that fluctuations usually push the order-disorder transition in commercial block copolymers to slightly higher $\chi N$, a value $\chi N=2.34$ has been used as the minimum in the calculations below. Following the approach of D. J. Lohse, W. W. Graessley, *Polymer Blends Volume 1: Formulation*, ed. D. R. Paul, C. B. Bucknall, 2000, $\chi N$ can be converted to the product of $\chi/v$ and $M/\rho$ where v is a reference volume, M is the number average block molecular weight and p is the melt density. The melt density is taken to be 0.78 g/cm$^3$ and a typical value of block molecular weight is approximately 25,500 g/mol based on a diblock at an overall molecular weight of 51,000 g/mol. $\chi/v$ for cases in which the comonomer is butene or propylene is determined using 130° C. as the temperature and then performing an interpolation or extrapolation of the data provided in Table 8.1 in the reference by Lohse and Graessley. For each comonomer type, a linear regression in mole percent comonomer was performed. For cases in which octene is the comonomer, the same procedure was performed with the data of Reichart, G. C. et al, *Macromolecules* (1998), 31, 7886. The entanglement molecular weight at 413 K (about 140° C.) in kg/mol is taken to be 1.1. Using these parameters, the minimum difference in comonomer content is determined to be, respectively, 20.0, 30.8 or 40.7 mole percent when the comonomer is octene, butene, or propylene. When the comonomer is 1-octene, the difference in mole percent octene between the hard segment and the soft segment (Δ octene) can be at least 20.0 mol %, at least 22 mol %, at least 23 mol %, at least 24 mol %, at least 25 mol %, or at least 26 mol %. In addition, the A octene value may be in the range of from 20.0 to 60 mol %, or from 22 to 45 mol %. When the comonomer is 1-butene, the difference in mole percent butene between the hard segment and the soft segment (Δ butene) can be at least 30.8 mol %, at least 33.9 mol %, at least 35.4 mol %, at least 36.9 mol %, at least 38.5 mol %, or at least 40.0 mol %. In addition, the A butene value may be in the range of from 30.8 to 80 mol %, from 33.9 to 60 mol %, from 36 to 50 mol %, or from 37 to 40 mol %. When the comonomer is propylene, the difference in mole percent propylene between the hard segment and the soft segment (Δ propylene) is at least 40.7 mol %, at least 44.7 mol %, at least 46.8 mol %, at least 48.8 mol %, at least 50.9 mol %, or at least 52.9 mol %. In addition, the A propylene value may be in the range of from 40.7 to 95 mol %, from 44.7 to 65 mol %, or from 48.8 to 60 mol %.

In some embodiments, the olefin multi-block interpolymer can have an average block index ("ABI") greater than zero but less than 0.4 or from 0.1 to 0.3. In other embodiments, ABI can be greater than 0.4 and up to 1.0. In some embodiments, ABI can be in the range of from 0.4 to 0.7, from 0.5 to 0.7, or from 0.6 to 0.9. In yet other embodiments, ABI can be in the range of from 0.3 to 0.9, from 0.3 to 0.8, or from 0.3 to 0.7, from 0.3 to 0.6, from 0.3 to 0.5, or from 0.3 to 0.4. In still other embodiments, ABI can be in the range of from 0.4 to 1.0, from 0.5 to 1.0, from 0.6 to 1.0, from 0.7 to 1.0, from 0.8 to 1.0, or from 0.9 to 1.0.

The olefin multi-block interpolymers used in the practice of this invention, their preparation and use, as well as methods for calculating certain properties (such as ABI) are more fully described in U.S. Pat. No. 7,947,793 and U.S. Patent Application Publication No. 2010/0113698 A1.

An example of a commercially available olefin multi-block interpolymer suitable for use herein includes, but is not limited to, INFUSE™ 9077, available from The Dow Chemical Company, Midland, Mich., USA.

As noted above, the impact-modifying polymer to be crosslinked can be an olefin block composite. The term "block composite" refers to polymer compositions comprising three components: (1) a soft copolymer, (2) a hard polymer, and (3) a block copolymer having a soft segment and a hard segment. The hard segment of the block copolymer is the same composition as the hard polymer in the block composite and the soft segment of the block copolymer is the same composition as the soft copolymer of the block composite.

The block copolymers present in the olefin block composite can be linear or branched. More specifically, when produced in a continuous process, the block composites can have a PDI from 1.7 to 15, from 1.8 to 3.5, from 1.8 to 2.2, or from 1.8 to 2.1. When produced in a batch or semi-batch process, the block composites can have a PDI from 1.0 to 2.9, from 1.3 to 2.5, from 1.4 to 2.0, or from 1.4 to 1.8. The term "olefin block composite" refers to block composites prepared solely or substantially solely from two or more α-olefin types of monomers. In various embodiments, the olefin block composite can consist of only two α-olefin type monomer units. An example of an olefin block composite would be a hard segment and hard polymer comprising only or substantially only propylene monomer residues with a soft segment and soft polymer comprising only or substantially only ethylene and propylene comonomer residues.

In describing olefin block composites, "hard" segments refer to highly crystalline blocks of polymerized units in which a single monomer is present in an amount greater than 95 mol %, or greater than 98 mol %. In other words, the comonomer content in the hard segments is less than 5 mol %, or less than 2 mol %. In some embodiments, the hard segments comprise all or substantially all propylene units. "Soft" segments, on the other hand, refer to amorphous, substantially amorphous or elastomeric blocks of polymerized units having a comonomer content greater than 10 mol %. In some embodiments, the soft segments comprise ethylene/propylene interpolymers.

When referring to block composites, the term "polyethylene" includes homopolymers of ethylene and copolymers of ethylene and one or more $C_{3-8}$ α-olefins in which ethylene comprises at least 50 mole percent. The term "propylene copolymer" or "propylene interpolymer" means a copolymer comprising propylene and one or more copolymerizable comonomers, where a plurality of the polymerized monomer units of at least one block or segment in the polymer (the crystalline block) comprises propylene, which can be present in an amount of at least 90 mole percent, at least 95 mole percent, or at least 98 mole percent. A polymer made primarily from a different α-olefin, such as 4-methyl-1-pentene would be named similarly. The term "crystalline," when used to describe olefin block composites, refers to a polymer or polymer block that possesses a first order transition or crystalline melting point ("Tm") as determined by differential scanning calorimetry ("DSC") or equivalent technique. The term "crystalline" may be used interchangeably with the term "semicrystalline." The term "amorphous" refers to a polymer lacking a crystalline melting point. The term, "isotactic" denotes polymer repeat units having at least 70 percent isotactic pentads as determined by $^{13}$C-nuclear magnetic resonance ("NMR") analysis. "Highly isotactic" denotes polymers having at least 90 percent isotactic pentads.

When referring to olefin block composites, the term "block copolymer" or "segmented copolymer" refers to a polymer comprising two or more chemically distinct regions or segments (referred to as "blocks") joined in a linear manner, that is, a polymer comprising chemically differentiated units which are joined end-to-end with respect to polymerized ethylenic functionality, rather than in pendent or grafted fashion. In an embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The olefin block composites employed herein are characterized by unique distributions of polymer PDI, block length distribution, and/or block number distribution, due, in a preferred embodiment, to the effect of shuttling agent(s) in combination with the catalyst(s) used in preparing the block composites.

The olefin block composite employed herein can be prepared by a process comprising contacting an addition polymerizable monomer or mixture of monomers under addition polymerization conditions with a composition comprising at least one addition polymerization catalyst, a cocatalyst and a chain shuttling agent ("CSA"), the process being characterized by formation of at least some of the growing polymer chains under differentiated process conditions in two or more reactors operating under steady state polymerization conditions or in two or more zones of a reactor operating under plug flow polymerization conditions.

Suitable monomers for use in preparing the olefin block composites of the present invention include any addition polymerizable monomer, such as any olefin or diolefin monomer, including any α-olefin. Examples of suitable monomers include straight-chain or branched α-olefins of 2 to 30, or 2 to 20, carbon atoms, such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; and di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl-1,4,8-decatriene. In various embodiments, ethylene and at least one copolymerizable comonomer, propylene and at least one copolymerizable comonomer having from 4 to 20 carbons, 1-butene and at least one copolymerizable comonomer having 2 or from 5 to 20 carbons, or 4-methyl-1-pentene and at least one different copolymerizable comonomer having from 4 to 20 carbons can be employed. In an embodiment, the olefin block composites are prepared using propylene and ethylene monomers.

Comonomer content in the resulting block composites may be measured using any suitable technique, such as NMR spectroscopy. It is highly desirable that some or all of the polymer blocks comprise amorphous or relatively amorphous polymers such as copolymers of propylene, 1-butene, or 4-methyl-1-pentene and a comonomer, especially random copolymers of propylene, 1-butene, or 4-methyl-1-pentene with ethylene, and any remaining polymer blocks (hard segments), if any, predominantly comprise propylene, 1-butene or 4-methyl-1-pentene in polymerized form. Preferably such hard segments are highly crystalline or stereospecific polypropylene, polybutene or poly-4-methyl-1-pentene, especially isotactic homopolymers.

Further, the block copolymers of the block composites comprise from 10 to 90 wt % hard segments and 90 to 10 wt % soft segments.

Within the soft segments, the mole percent comonomer may range from 5 to 90 wt %, or from 10 to 60 wt %. In the case where the comonomer is ethylene, it can be present in an amount from 10 to 75 wt %, or from 30 to 70 wt %. In an embodiment, propylene constitutes the remainder of the soft segment.

In an embodiment, the block copolymers of the olefin block composites comprise hard segments that are 80 to 100 wt % propylene. The hard segments can be greater than 90 wt %, 95 wt %, or 98 wt % propylene.

The block composites described herein may be differentiated from conventional, random copolymers, physical blends of polymers, and block copolymers prepared via sequential monomer addition. The block composites may be differentiated from random copolymers by characteristics such as higher melting temperatures for a comparable amount of comonomer, block composite index, as described below; from a physical blend by characteristics such as block composite index, better tensile strength, improved fracture strength, finer morphology, improved optics, and greater impact strength at lower temperature; from block copolymers prepared by sequential monomer addition by molecular weight distribution, rheology, shear thinning, rheology ratio, and in that there is block polydispersity.

In some embodiments, the block composites have a Block Composite Index ("BCI"), as defined below, that is greater than zero but less than 0.4, or from 0.1 to 0.3. In other embodiments, BCI is greater than 0.4 and up to 1.0. Additionally, the BCI can range from 0.4 to 0.7, from 0.5 to 0.7, or from 0.6 to 0.9. In some embodiments, BCI ranges from 0.3 to 0.9, from 0.3 to 0.8, from 0.3 to 0.7, from 0.3 to 0.6, from 0.3 to 0.5, or from 0.3 to 0.4. In other embodiments, BCI ranges from 0.4 to 1.0, from 0.5 to 1.0, from 0.6 to 1.0, from 0.7 to 1.0, from 0.8 to 1.0, or from 0.9 to 1.0. BCI is herein defined to equal the weight percentage of diblock copolymer divided by 100% (i.e., weight fraction). The value of the block composite index can range from 0 to 1, wherein 1 would be equal to 100% diblock and zero would be for a material such as a traditional blend or random copolymer. Methods for determining BCI can be found, for example, in U.S. Published Patent Application No. 2011/0082258 from paragraph [0170] to [0189].

The olefin block composites can have a Tm greater than 100° C., greater than 120° C., or greater than 125° C. The melt index ($I_2$") of the block composite can range from 0.1 to 1000 g/10 min., from 0.1 to 50 g/10 min., from 0.1 to 30 g/10 min., or from 1 to 10 g/10 min. The block composites can have a weight average molecular weight ("Mw") from 10,000 to 2,500,000, from 35,000 to 1,000,000, from 50,000 to 300,000, or from 50,000 to 200,000 g/mol.

Processes useful in producing the olefin block composites suitable for use in the present invention may be found, for example, in U.S. Patent Application Publication No. 2008/0269412, published on Oct. 30, 2008. Suitable catalysts and catalyst precursors for use in preparing the olefin block composites include metal complexes such as disclosed in WO 2005/090426, in particular, those disclosed starting on page 20, line 30 through page 53, line 20. Suitable catalysts are also disclosed in U.S. 2006/0199930; U.S. 2007/0167578; U.S. 2008/0311812; U.S. 2011/0082258; U.S. Pat. No. 7,355,089; and WO 2009/012215. Suitable co-catalysts are those disclosed in WO 2005/090426, in particular, those disclosed on page 54, line 1 to page 60, line 12. Suitable chain shuttling agents are those disclosed in WO 2005/090426, in particular, those disclosed on page 19, line 21 through page 20 line 12. Particularly preferred chain shuttling agents are dialkyl zinc compounds. The olefin block composites themselves are more fully described in U.S. Pat. No. 8,476,366.

As noted above, the impact-modifying polymer can be crosslinked using various methods. In an embodiment, the elastomers described above can be crosslinked via (i) silane-grafting the elastomer to thereby form a silane-grafted elastomer and thereafter crosslinking the silane-grafted elastomer in the presence of a moisture-cure catalyst and water; or (ii) grafting the elastomer with maleic anhydride ("MAH") and thereafter crosslinking the MAH-grafted elastomer via amination crosslinking.

As just noted, one method of crosslinking the impact-modifying polymer includes incorporation of silane functionality in to the elastomer. Any silane that will effectively copolymerize with or graft to an elastomer selected from those described above can be used herein. In various embodiments, a silane comonomer having the following formula can be incorporated (i.e., grafted or copolymerized) into the above-described elastomer:

in which $R^1$ is a hydrogen atom or methyl group; x is 0 or 1 with the proviso that when x is 1, n is at least 1; m and n are independently an integer from 0 to 12 inclusive, preferably 1 to 4, and each $R^2$ is independently a hydrolyzable organic group, such as an alkoxy group having from 1 to 12 carbon atoms (e.g., methoxy, ethoxy, butoxy), an aryloxy group (e.g., phenoxy), an araloxy group (e.g., benzyloxy), an aliphatic acyloxy group having from 1 to 12 carbon atoms (e.g., formyloxy, acetyloxy, propanoyloxy), amino or substituted amino groups (e.g., alkylamino, arylamino), or a lower alkyl group having 1 to 6 carbon atoms inclusive, with the proviso that not more than one of the three R groups is an alkyl. Such silanes may be copolymerized with monomers forming the above-described elastomer compounds in a reactor. Such silanes may also be grafted to a suitable elastomer by the use of a suitable quantity of organic peroxide. Also included are silanes that add to unsaturation in the elastomer via free radical processes, such as mercaptopropyl trialkoxysilane.

Suitable silanes include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer or copolymerized in-reactor with other monomers (such as ethylene and acrylates). These silanes and their method of preparation are more fully described in U.S. Pat. No. 5,266,627 to Meverden, et al. Vinyl trimethoxy silane (VTMS), vinyl triethoxy silane, vinyl triacetoxy silane, gamma-(meth)acryloxy propyl trimethoxy silane and mixtures of these silanes are the preferred silane comonomers for use in this invention.

The amount of silane comonomer used can vary widely depending upon the nature of the polymer, the silane, the processing or reactor conditions, the grafting or copolymerization efficiency, the ultimate application, and similar factors. However, typically at least 0.5, or at least 0.7 wt % is used, based on the total weight of the elastomer. Considerations of convenience and economy are two of the principal limitations on the maximum amount of silane comonomer employed, and typically the maximum amount of silane comonomer does not exceed 5 wt % or 3 wt %.

The silane comonomer can be grafted to the elastomer by any conventional or hereafter discovered method, typically in the presence of a free radical initiator (e.g., peroxides or azo compounds) or by ionizing radiation, etc. Examples of suitable free radical initiators include organic initiators, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is 2,2-azobisisobutyronitrile. The amount of initiator can vary, but it is typically present in an amount of at least 0.04 parts per hundred resin ("phr"), or at least 0.06 phr. Typically, the initiator does not exceed 0.15 phr, or 0.10 phr. The weight ratio of silane comonomer to initiator also can vary widely, but the typical comonomer: initiator weight ratio is between 10:1 to 500:1, or between 18:1 and 250:1. As used in parts per hundred resin or phr, "resin" means the above-described elastomer.

While any conventional method can be used to graft the silane comonomer to the elastomer, an exemplary method includes blending the two components with the initiator in the first stage of a reactor extruder, such as a Buss kneader. The grafting conditions can vary, but the melt temperatures are typically between 160 and 260° C., or between 190 and 230° C., depending upon the residence time and the half life of the initiator.

Copolymerization of silane comonomers with monomers employed in preparation of the above-described elastomers may be performed in the reactor or reactors used to prepare the above-described elastomers. Such copolymerization techniques are known to those of ordinary skill in the art.

The elastomer containing hydrolyzable silane functionality can be crosslinked by use of a condensation catalyst. The condensation catalyst can be any compound that catalyzes a moisture crosslinking reaction with hydrolysable silane groups. Condensation catalysts can include carboxylates of metals, such as tin, zinc, iron, lead, and cobalt; organic bases, inorganic acids, and organic acids. Examples of such catalysts include, but are not limited to, dibutyltin dilaurate ("DBTDL"), dibutyltin diacetate, dioctyltin dilaurate, stannous acetate, stannous caprylate, lead naphthenate, zinc caprylate, cobalt naphthenate, ethyl amines, dibutyl amine, hexylamines, pyridine, inorganic acids, such as sulphuric acid and hydrochloric acid, as well as organic acids, such as sulfonic acids (e.g., toluene sulfonic acid), acetic acid, stearic acid and maleic acid. In various embodiments, the catalyst is selected from a tin-based catalyst and a sulfonic acid. In still other embodiments, the catalyst can be a tin carboxylate. Furthermore, in certain embodiments, the catalyst is DBTDL. The catalyst can be employed neat or as part of a masterbatch. Such a masterbatch may additionally include, for example, a polyolefin carrier (e.g., polyethylene), an antioxidant, and/or a metal deactivator. An example of a suitable commercially available catalyst-containing masterbatch is DFDA-5480 NT™, available from The Dow Chemical Company, Midland, Mich., USA.

The minimum amount of condensation catalyst employed is a catalytic amount. Typically this amount is at least 0.01 wt %, at least 0.02 wt %, or at least 0.03 wt %, based on the combined weight of the impact-modifying polymer and the condensation catalyst. The only limit on the maximum amount of crosslinking catalyst in the impact-modifying polymer is that imposed by economics and practicality (e.g., diminishing returns), but typically a general maximum is less than 5 wt %, less than 3 wt %, or less than 2 wt % based on the combined weight of the impact-modifying polymer and the condensation catalyst. In various embodiments, the condensation catalyst can be present in the polymeric blend in an amount ranging from 0.01 to 0.5 wt %, based on the entire weight of the polymeric blend.

As noted above, an alternative crosslinking procedure includes grafting or copolymerizing maleic anhydride with the above-described elastomer to make the crosslinkable impact-modifying polymer. Grafting techniques are known in the art, and MAH comonomers can be grafted with the above-described elastomers using any known or hereafter discovered methods in the art. When MAH copolymers are used, high-pressure reactor polymers containing ethylene, maleic anhydride, and optionally addition co-monomers can be employed. For example, ethylene/maleic anhydride/butyl acrylate terpolymers can be used as the MAH-containing copolymer. A commercial example of such a terpolymer is Lotader AX 8840 by Arkema.

Whether copolymerized or grafted, the MAH comonomers can be present in the impact-modifying polymer in an amount ranging from less than 0.25 wt % to greater than 1.0 wt %, from 0.25 to 1.5 wt %, or from 0.5 to 1.25 wt %, based on the entire weight of the elastomer.

The resulting MAH-functionalized elastomers can be crosslinked via an amination process. In such a process, the MAH-functionalized elastomer is combined with a diamine crosslinker and, if performing crosslinking in situ (as described below), the above-described crystalline polypropylene and any other desired components. Selective crosslinking of the MAH-functionalized elastomer can then be achieved using either elevated temperatures (e.g., 180° C.) or an amine catalyst. In various embodiments, the MAH-functionalized elastomer can be selectively crosslinked in situ via extrusion of the polymeric blend at elevated temperatures.

Any known or hereafter discovered diamine crosslinker can be employed for selectively crosslinking the MAH-functionalized elastomer. Suitable examples include, but are not limited to, 1,12-diaminododecane, hexamethylenediamine, ethylenediamine, 2-methyl-1,5-pentanediamine, and 1,3-cyclohexane bis(methylamine). In various embodiments, the amount of diamine crosslinker employed can range from 0.8 to 1.3, from 0.9 to 1.2, or from 1.0 to 1.1 molar equivalents of amine group per maleic anhydride functionality in the MAH-functionalized elastomer. In one or more embodiments, the diamine crosslinker employed can be present in an amount of about 1.1 molar equivalents of amine group per maleic anhydride functionality in the MAH-functionalized elastomer.

In one or more embodiments, the crosslinked impact-modifying polymer can be present in the polymeric composition in an amount ranging from 4 to 50 wt %, from 4 to 30 wt %, from 4 to 25 wt %, from 4 to 20 wt %, or from 4 to 15 wt % based on the entire weight of the polymeric composition.

Optional Compatibilizer

In various embodiments, the polymeric blend can optionally comprise one or more compatibilizers. In various embodiments, the optional compatibilizer can be one or more additional elastomer components that are not crosslinked. For example, the polymeric blend can comprise a non-crosslinked elastomer selected from the group consisting of olefin elastomers, olefin multi-block interpolymers, and olefin block composites, such as described above. The optional compatibilizer, if present, can be used in amounts ranging from 1 to 30 wt %, from 2 to 20 wt %, or from 3 to 10 wt % based on the entire weight of the polymeric blend.

The compatibilizer can be any one or more of the above-described elastomers in non-crosslinked and non-crosslinkable (e.g., non-silane-grafted, non-MAH-grafted) form. In one or more embodiments, the compatibilizer can be an olefin block composite. Furthermore, in various embodiments, the compatibilizer can be an isotactic-polypropylene/ethylene-propylene olefin block composite, as described above.

Additives

In various embodiments, a hydrocarbon oil can also be included in the polymeric blends. This additional component may reduce subsequent diffusion and absorption of undesirable low molecular weight species typically found in fiber optical cable grease, thereby improving the balance between impact performance and gel compatibility.

When employed, the hydrocarbon oil can be present in the polymeric blends in an amount ranging from 0.2 to 10 parts per hundred resin ("phr"), or from 0.3 to 3.0 phr based on 100 weight parts of all polymer components present in the polymeric blend. Higher molecular weight hydrocarbon oils are more preferable than low molecular weight hydrocarbon oils. In various embodiments, the hydrocarbon oil can have a viscosity greater than 400 centistokes as measured by ASTM D-445. Additionally, the hydrocarbon oil can have a specific gravity between 0.86 and 0.90 as measured by ASTM D-1250. Also, the hydrocarbon oil can have a flash point greater than 300° C. as measured by ASTM D-92. Furthermore, the hydrocarbon oil can have a pour point greater than −10° C. as measured by ASTM D-97. Moreover, the hydrocarbon oil can have an aniline point between 80 and 300° C. as measured by ASTM D-611.

In various embodiments, the polymeric blend can include one or more particulate fillers, such as glass fibers or various mineral fillers including nano-composites. Fillers, especially those with elongated or platelet-shaped particles providing a higher aspect ratio (length/thickness), may improve modulus and post extrusion shrinkage characteristics. Fillers may be included in the polymeric blend in an amount ranging from 0.1 to 20 phr based on 100 weight parts of all polymer components present in the polymeric blend.

The polymeric blends may also contain other types of additives. Representative additives include, but are not limited to, antioxidants, cross linking co-agents, cure boosters and scorch retardants, processing aids, coupling agents, ultraviolet stabilizers (including UV absorbers), antistatic agents, nucleating agents, slip agents, lubricants, viscosity control agents, tackifiers, anti-blocking agents, surfactants, extender oils, acid scavengers, flame retardants and metal deactivators. These additives are typically used in a conventional manner and in conventional amounts, e.g., from 0.01 phr or less to 20 phr or more based on 100 weight parts of all polymer components present in the polymeric blend.

Suitable UV light stabilizers include hindered amine light stabilizers ("HALS") and UV light absorber ("UVA") additives. Representative UVA additives include benzotriazole types such as Tinuvin 326 and Tinuvin 328 commercially available from Ciba, Inc. Blends of HAL's and UVA additives are also effective.

Examples of antioxidants include hindered phenols such as tetrakis[methylene(3,5-di-tert-butyl-4-hydroxyhydro-cinnamate)]methane; bis[(beta-(3,5-ditert-butyl-4-hydroxybenzyl)methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non ionic surfactants; silicone fluids and polysiloxanes.

Compounding

In one or more embodiments, the components of the polymeric blend used in the practice of this invention can be added to a batch or continuous mixer for melt blending. The components can be added in any order or first preparing one or more masterbatches for blending with the other components. Additives are usually blended with one or more other components before being added to the bulk resins and/or filler. In one embodiment, the additives can be added directly to the compounding line without the use of previously prepared masterbatches. Typically, melt blending is conducted at a temperature above the highest melting polymer's melting point but lower than the activation temperature of peroxide (if one is present). The melt-blended composition can then either be delivered to an extruder or an injection molding machine or passed through a die for shaping into the desired article, or converted to pellets, tape, strip or film or some other form for storage or to prepare the material for feeding to a next shaping or processing step. Optionally, if shaped into pellets or some similar configuration, then the pellets, etc. can be coated with an anti-block agent to facilitate handling while in storage.

Compounding of the compositions can be effected by standard equipment known to those skilled in the art. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder. The type of mixer utilized, and the operating conditions of the mixer, will affect properties of the composition such as viscosity, volume resistivity, and extruded surface smoothness.

Molded electrical articles comprising the polymeric blends of this invention can be made via an injection-molding process in which the compounded material is fed to the injection-molding machine to manufacture a molded part of a given design.

In Situ Crosslinking

As noted above, the crosslinked impact-modifying polymer can be crosslinked following compounding with the other components of the polymeric blend, including any desired crosslinking catalysts, as described above. In various embodiments, such a crosslinking step can be performed with the compound in pellet, granular or other forms (i.e., prior to shaping into a finished article). In other embodiments, crosslinking of the impact-modifying polymer can occur following formation of an optical cable protective component, such as those described below.

For example, when a silane-functionalized elastomer is employed as the crosslinkable impact-modifying polymer, the elastomer can be crosslinked at ambient conditions as known in the art. Though not necessary, if desired the polymer blend, extruded blend, or optical cable component can be exposed to either or both elevated temperature and external moisture. If an elevated temperature is employed, it is typically between ambient and could be 50° C. or even higher for a period of time such that the impact-modifying polymer reaches a desired degree of crosslinking. As another example, when an MAH-functionalized elastomer is employed as the crosslinkable impact-modifying polymer, the impact-modifying polymer can be crosslinked at elevated temperatures employed during extrusion of the polymeric blend.

Optical Fiber Cable

In various embodiments, an optical fiber cable can be prepared that includes at least one extruded optical protective component made from the polymer blends described herein and incorporating at least one optical fiber transmission medium.

Figure 1:
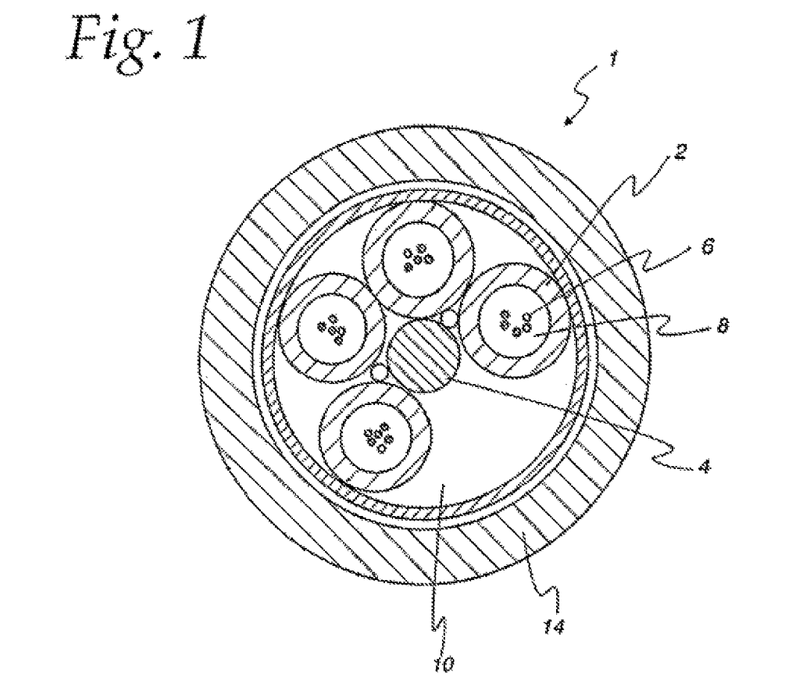
FIG. 1 shows a cross-sectional view of a loose buffer tube optical fiber cable.

A cross-sectional view of a common loose buffer tube optical fiber cable design is shown in FIG. 1. In this design of optical fiber cable 1, buffer tubes 2 are positioned radially around a central strength member 4, with a helical rotation to the tubes in the axial length. The helical rotation allows bending of the cable without significantly stretching the tube or the optic fibers 6.

If a reduced number of buffer tubes is required, then foamed filler rods 10 can be used as low-cost spacers to occupy one or more buffer tube positions to maintain cable geometry. The cable jacket 14 is generally fabricated from a polyethylene-based material.

The buffer tubes are typically filled with an optic cable grease or gel. Various gel compounds are available commercially, a number of which are hydrocarbon-based greases incorporating hydrocarbon oils. Others are polymer based and use a low viscosity polymer formulated with hydrocarbon oils and other additives for even lower viscosity for ease of filling. These greases and gels provide the suspension and protection needed in the immediate environment surrounding the fibers, including eliminating air space. This filling compound (also referred to as "gel" or "grease") provides a barrier against water penetration, which is detrimental to the optic transmission performance In either oil-based grease or polymer formulated with oil for lower viscosity, the hydrocarbon oils are typically low-molecular-weight hydrocarbon oils, which can be absorbed into polymeric buffer tubes. Absorption typically adversely affects the tube's mechanical properties, such as flexural modulus and crush resistance. A decrease in crush resistance renders the optic fibers more prone to mechanical stress, thereby permitting an increase in signal attenuation and increasing the possibility of catastrophic failure. Thus, good retention of modulus and crush resistance along with minimal oil absorption, commonly referred to as "grease compatibility," are important performance characteristics for polymeric materials to be used for making extruded optical protective component.

Many other buffer tube cable designs are possible. The size and materials of construction for the central strength and tensile member, the dimensions and number of buffer tubes, and the use of metallic armors and multiple layers of jacketing material are among the design elements.

Figure 2:
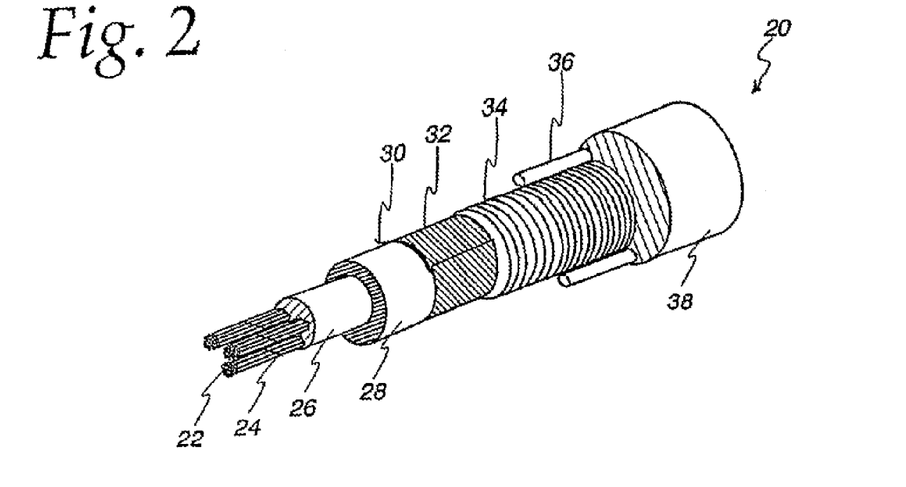
FIG. 2 shows a partial cutaway view of a core tube optical fiber cable.

A cross-sectional view of a typical core-tube optical fiber cable, also known as "central tube," is illustrated in FIG. 2. Bundles 24 of the optical fibers 22 are positioned near the center of the optical cable 20 within a central, cylindrical core tube 28. The bundles are embedded in a filling material 26. Water blocking tape 32 surrounds the ripcords 30, which are on the surface of the core tube. A corrugated, coated steel cylinder 34 surrounds the tape to protect the bundles. Wire strength members 36 provide the cable with strength and stiffness. A jacket 38, which is generally fabricated from a polyethylene-based material, surrounds all of the components. In this design, the mechanical functions are incorporated into the outer sheathing system composed of the core tube, polyolefin jacketing layers, tensile and compressive strength members, metallic armors, core wraps, water blocking components, and other components.

The core tube is typically larger in diameter than a buffer tube to accommodate bundles of fibers or the use of ribbon components containing the optic fibers. Color-coded binders are typically used to bundle and identify the fibers. The core tube can contain water blocking grease or super-absorbent polymer elements surrounding the optic fiber components. The optimal material characteristics for the core tube component are often similar to those of the buffer tube application.

Figure 3:
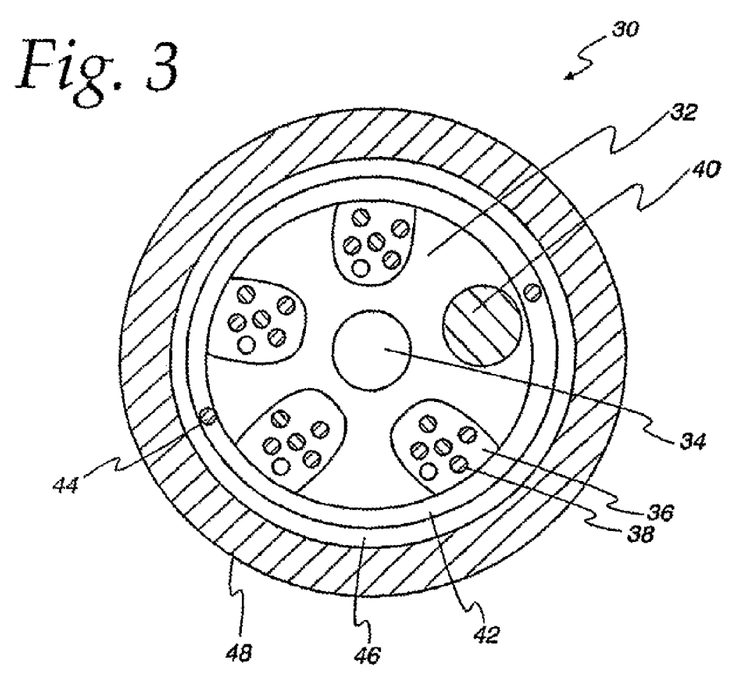
FIG. 3 shows a cross-sectional view of a slotted core optical fiber cable.

A cross-sectional view of a typical slotted-core cable design is shown in FIG. 3. The optical fiber cable 30 includes a jacket 48 and a slotted core 32, having a central member 34. The central member prevents buckling and controls axial shrinkage of the extruded slotted core profile shape. The jacket and the slotted core are typically made from a polyolefin-based material.

The slotted core has slots 36 in which optical fibers 38 are located. A filler rod 40 also may occupy one or more slots. A water-blocking layer 42, which may have one or more ripcords 44, surrounds the slotted core 32. A dielectric strength member layer 46 surrounds the water blocking layer.

An optical fiber cable, such as those described above, can typically be made in a series of sequential manufacturing steps. Optical transmission fibers are generally manufactured in the initial step. The fibers can have a polymeric coating for mechanical protection. These fibers can be assembled into bundles or ribbon cable configurations or can be directly incorporated into the cable fabrication.

Optical protective components can be manufactured using an extrusion fabrication process. Typically, a single screw plasticating extruder discharges a fluxed and mixed polymer under pressure into a wire and cable cross-head. The cross-head turns the melt flow perpendicular to the extruder and shapes the flow into the molten component. For buffer and core tubes, one or more optic fibers or fiber assemblies and grease are fed into the back of the cross-head and exit the cross-head within the molten tube that is then cooled and solidified in a water trough system. This component is eventually collected as a finished component on a take-up reel.

To fabricate components comprised of two or more material layers, there typically would be separate plasticating extruders feeding the melt compositions into a multi-layer cross-head where it is shaped into the desired multi-layer construction.

Slotted core members and other profile extrusion components would typically be extruded in a similar profile extrusion process incorporating an appropriate shaping die, and then subsequently combined with the optical fiber components to fabricate the finished cable.

To control excess fiber length, a tensioning system is used to feed the fiber components into the tube fabrication process. In addition, component materials selection, the tube extrusion and cross-head equipment, and processing conditions are optimized to provide a finished component where post extrusion shrinkage does not result in excessive slack in the optic fiber components.

The extruded optical protective components, along with other components such as central components, armors, wraps, are then subsequently processed in one or more steps to produce the finished cable construction. This typically includes processing on a cabling line where the components are assembled with a fabricating extruder/crosshead then used to apply the polymeric jacketing.

Test Methods

Brittleness Temperature

Determine brittleness temperature according to ASTM D746.

Density

Density is determined according to ASTM D792.

Flexural (Young's) Modulus

Determine flexural (Young's) modulus according to ASTM D790.

Flexural Stress @ 3.5% Strain

Determine flexural stress according to ASTM D790.

Izod Impact Strength

Determine notched Izod impact strength according to ASTM D256.

Melt Index

Melt index, or $I_2$, is measured in accordance by ASTM D1238, condition 190° C./2.16 kg, and is reported in grams eluted per 10 minutes.

Molecular Weight Distribution

The gel permeation chromatography ("GPC") system consists of a Polymer Char GPC-IR High Temperature Chromatograph, equipped with an IR4 infra-red detector from Polymer ChAR (Valencia, Spain). Data collection and processing is performed using Polymer Char software. The system is also equipped with an on-line solvent degassing device.

Suitable high temperature GPC columns can be used, such as four 30 cm long Shodex HT803 13 micron columns, or four 30 cm Polymer Labs columns of 13-micron mixed-pore-size packing (Olexis LS, Polymer Labs). The sample carousel compartment is operated at 140° C., and the column compartment is operated at 150° C. The samples are prepared at a concentration of 0.1 grams of polymer in 50 milliliters of solvent. The chromatographic solvent and the sample preparation solvent is 1,2,4-trichlorobenzene ("TCB") containing 200 ppm of 2,6-di-tert-butyl-4methylphenol ("BHT"). The solvent is sparged with nitrogen. The polymer samples are stirred at 160° C. for four hours. The injection volume is 200 microliters. The flow rate through the GPC is set at 1 mL/minute.

The GPC column set is calibrated by running 21 narrow molecular weight distribution polystyrene standards. The molecular weight ("MW") of the standards ranges from 580 g/mol to 8,400,000 g/mol, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to, or greater than, 1,000,000 g/mol, and at 0.05 g in 50 mL of solvent for molecular weights less than 1,000,000 g/mol. The polystyrene standards are dissolved at 80° C., with agitation, for 30 minutes. The narrow standards mixtures are run first, and in order of decreasing highest molecular weight component to minimize degradation. The polystyrene standard peak molecular weights are converted to polyethylene molecular weight using Equation (1) (as described in Williams and Ward, J. Polym. Sci., Polym. Letters, 6, 621 (1968)):

$$M\text{polyethylene} = A \times (M\text{polystyrene})^B \qquad (\text{Eq. 1})$$

where M is the molecular weight of polyethylene or polystyrene (as marked), and B is equal to 1.0. It is known to those of ordinary skill in the art that A may be in a range of about 0.38 to about 0.44, and is determined at the time of calibration using a broad polyethylene standard, as discussed below. Use of this polyethylene calibration method to obtain molecular weight values, such as the molecular weight distribution (MWD or Mw/Mn), and related statistics, is defined here as the modified method of Williams and Ward. The number average molecular weight, the weight average molecular weight, and the z-average molecular weight are calculated from the following equations.

$$Mw_{cc} = \sum_i \left(\frac{C_i}{\sum_i C_i}\right) M_i = \sum_i w_i M_{cc,i} \qquad (\text{Eq. 2})$$

$$M_{n,cc} = \sum w_i / \sum (w_i / M_{cc,i}) \qquad (\text{Eq. 3})$$

$$M_{z,cc} = \sum (w_i M_{cc,i}^2) / \sum (w_i / M_{cc,i}) \qquad (\text{Eq. 4})$$

Tensile Modulus (Secant 1%)
Determine tensile modulus according to ASTM D638.
Tensile Strength
Determine tensile strength according to ASTM D638.
Tensile Elongation
Determine tensile elongation according to ASTM D638.

Weight Gain (Grease Resistance)
Determine weight gain according to YD/T1118.1-2001.
1. Select 6 tensile bars (ASTM D638 Type I) and weigh the mass of each bar, denoted as $m_{fresh}$
2. Grease coating on the tensile bars
   a. Gel is first degassed in a vacuum oven at 80° C. to eliminate any bubbles or air pockets in the grease.
   b. The grease is coated on only one side of the test specimen carefully using the blade, and the grease thickness is less than 1 mm.
   c. The coated specimen is then put on a plate with the grease face turned upwards.
3. Aging in the oven: The plates with specimens are then put into the air-circulated oven for aging. The aging condition is 80° C. for 360 hrs.
4. Weigh the mass of tensile bars after aging: After the aging, the specimens are removed from oven, and are wiped up by tissue and allowed to cool down to room temperature and conditioned for 24 h before weighing. The mass of the aged tensile bars is denoted as $m_{aging}$, the weight gain is calculated according to equation below:

$$\text{Weight Gain (\%)} = \frac{m_{aging} - m_{fresh}}{m_{fresh}} * 100$$

Materials

The following materials are employed in the Examples, below.

The polybutylene terephthalate ("PBT") employed is Ultradur B6550 LN, having a density of 1.3 g/cm³ and a melt volume-flow rate MVR of 9 cm³/10 min at 250° C. and 2.16 kg, which is available from BASF Chemical Company SE, Ludwigshafen, Germany.

The crystalline polypropylene employed is Globalene PC366-5, which has a crystallinity of 55.3%, a density of 0.903 g/cm³, and a melt index of 5.5 g/10 min. at 230° C./2.16 kg. PC366-5 is commercially available from LCY Chemical Corporation, Taipei, Taiwan.

The silane-grafted polyolefin elastomer is a blend of ENGAGE™ 8200 and ENGAGE™ 8402 polyolefin elastomers, both commercially available from The Dow Chemical Company, Midland, Mich., USA, that have been silane-grafted. The elastomer blend comprises 59 weight percent ENGAGE™ 8200 and 38 weight percent ENGAGE™ 8402, based on the entire silane-grafted polyolefin elastomer weight. ENGAGE™ 8200 is an ethylene/octene polyolefin elastomer having a melt index ranging from 4.0 to 6.0 g/10 min. and a density ranging from 0.867 to 0.873 g/cm³. ENGAGE™ 8402 is an ethylene/octene polyolefin elastomer having a melt index ranging from 22.5 to 37.5 g/10 min. and a density ranging from 0.899 to 0.905 g/cm³. The silane-grafted polyolefin elastomer has a melt index ranging from 5.0 to 8.0 g/10 min., a maximum moisture content of 20 ppm, and a silane monomer content (determined by FTIR) of from 1.40 to 1.90 wt %.

The silane-grafted polyolefin elastomer blend is prepared in a reactive extrusion step via a grafting reaction of vinyltrimethoxysilane (VTMS) and peroxide on a 27-mm, 48 L/D co-rotating, intermeshing twin-screw extruder operated at 250 rpm, a 20 kg/hr throughput rate, and a temperature profile starting from the feeder barrel to the die as follows: 100° C./190° C./230° C./230° C./230° C./230° C./230°

C./230° C./190° C./190° C./190° C./190° C. The grafting temperature is set at 230° C. The vacuum degree is set at 0.08 MPa. The VTMS loading level is 2 wt %, and peroxide (Luperox 101) loading level is 0.1 wt %. VTMS and peroxide are mixed well prior to being pumped into the extruder. The grafting level of polyolefin elastomer is 1.62 wt %.

The olefin multi-block interpolymer is an ethylene/octene interpolymer and has a target density of 0.870 g/cm$^3$ and a target melt index of 0.5 g/10 min. The ethylene/octene multi-block interpolymer is prepared according to the procedure described in detail in U.S. Pat. No. 7,947,793 for Example numbers 24-28 and 29-40. The ethylene/octene multi-block interpolymer has the following properties:

Density: 0.873 g/cm$^3$
$I_2$: 0.57 g/10 min.
$I_{10}$: 6.06 g/10 min.
$I_{10}/I_2$: 10.63
Weight-average molecular weight ("Mw") (in g/mol): 148,600
Number-average molecular weight ("Mn") (in g/mol): 53,590
Polydispersity index ("Mw/Mn"): 2.77
Heat of fusion (in J/g): 38.23
Melting temperature ("$T_m$"): 118.4° C.
Crystallization temperature ("$T_c$"): 92.0° C.
Overall octene content (in mol %): 18.9
Octene content in Soft Segment (in mol %): 27.1
Octene content in Hard Segment (in mol %): 1.4
ΔOctene: 25.7

The silane-grafted olefin multi-block interpolymer is the same ethylene/octene interpolymer as just described, but has been grafted with silane functionality. The silane monomer content of the silane-grafted ethylene/octene interpolymer is 1.62 wt %. The silane-grafted ethylene/octene interpolymer has a density that is substantially the same as the un-grafted ethylene/octene interpolymer.

The silane-grafted ethylene/octene multi-block interpolymer is prepared in a 27-mm twin-screw extruder under a melt-compounding temperature of 230° C. The VTMS was added at 2 wt % in the presence of 1,000 ppm (0.1%) of Luperox 101 peroxide.

DFDA-5480 is a polyethylene/catalyst masterbatch having a density of about 0.927 g/cm$^3$, a melt index of about 3.05 g/10 min., and containing a tin-based catalyst in an amount of 1.7 wt %, an antioxidant in an amount of 3.5 wt %, and a metal deactivator in an amount of 1.67 wt %. DFDA-5480 is commercially available from The Dow Chemical Company, Midland, Mich., USA.

DHT-4A is an acid scavenger having a chemical formula of:

Mg$_{1-x}$Al$_x$(OH)$_2$(CO$_3$)$_{x/2}$·mH$_2$O(0<x≤5)

and is described as a magnesium aluminum hydroxide carbonate hydrate. HDT-4A is commercially available from Kisuma Chemicals B.V., The Netherlands.

NA-11A is a nucleating agent is a nucleating agent with the chemical name sodium 2, 2'-methylene-bis-(4,6-di-tert-butylphenyl)phosphate (CAS NO. 85209-91-2), which is commercially available from ADEKA Corporation, Tokyo, Japan.

IRGANOX™ 1010 is an antioxidant with the chemical name pentaerythritol tetrakis(3-(3,5-di-tert-butyl-4-hydroxyphenyl)propionate), which is commercially available from BASF SE, Ludwigshafen, Germany.

IRGANOX™ 168 is an antioxidant with the chemical name tris(2,4-ditert-butylphenyl)phosphite, which is commercially available from BASF SE, Ludwigshafen, Germany.

The BC B is an isotactic-polypropylene/ethylene-propylene olefin block composite having a density of 0.905 g/cm$^3$ and a melt index of 6 at 230° C.

The BC B is prepared according to the following procedure. Catalyst-1 ([[rel-2',2'''-[(1R,2R)-1,2-cylcohexanediyl-bis(methyleneoxy-κO)] bis[3-(9H-carbazol-9-yl)-5-methyl [1,1'-biphenyl]-2-olato-κO]](2-)]dimethyl-hafnium) and cocatalyst-1, a mixture of methyldi(C$_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B(C$_6$F$_5$)$_4$], substantially as disclosed in U.S. Pat. No. 5,919,983, Ex. 2., are purchased from Boulder Scientific and used without further purification.

CSA-1 (diethylzinc or DEZ) and cocatalyst-2 (modified methylalumoxane ("MMAO")) are purchased from Akzo Nobel and used without further purification. The solvent for the polymerization reactions is a hydrocarbon mixture (ISOPAR®E) obtainable from ExxonMobil Chemical Company and purified through beds of 13-X molecular sieves prior to use.

The block composite is prepared using two continuous stirred tank reactors ("CSTR") connected in series. The first reactor is approximately 12 gallons in volume while the second reactor is approximately 26 gallons. Each reactor is hydraulically full and set to operate at steady state conditions. Monomers, solvent, hydrogen, catalyst-1, cocatalyst-1, cocatalyst-2 and CSA-1 are fed to the first reactor according to the process conditions outlined in Table 1. The first reactor contents as described in Table 1 flow to a second reactor in series. Additional monomers, solvent, hydrogen, catalyst-1, cocatalyst-1, and optionally, cocatalyst-2, are added to the second reactor.

TABLE 1

Block Composite Process Conditions

| Condition | BC B | |
|---|---|---|
| | 1$^{st}$ Reactor | 2$^{nd}$ Reactor |
| Reactor Control Temp. (° C.) | 140 | 135 |
| Solvent Feed (lb/hr) | 242 | 245 |
| Propylene Feed (lb/hr) | 5.5 | 49.3 |
| Ethylene Feed (lb/hr) | 47.1 | — |
| Reactor Propylene Conc. (g/L) | 2.0 | 2.0 |
| Hydrogen Feed (SCCM) | 9.6 | 9.9 |
| Catalyst Efficiency (gPoly/gM)*10$^6$ | 0.86 | 0.03 |
| Catalyst Flow (lb/hr) | 1.96 | 2.14 |
| Catalyst Conc. (ppm) | 29.9 | 900 |
| Cocatalyst-1 Flow (lb/hr) | 1.47 | 2.16 |
| Cocatalyst-1 Conc. (ppm) | 399 | 7500 |
| Cocat.-2 Flow (lb/hr) | — | 0.3 |
| Cocat.-2 Conc. (ppm) | — | 2686 |
| DEZ Flow (lb/hr) | 0.64 | — |
| DEZ Concentration (ppm) | 3599 | — |

The block composite prepared as described above has the following properties shown in Table 2:

TABLE 2

Block Composite Properties

| Property | BC B |
|---|---|
| Melt Flow Rate ("MFR") (230° C./2.16 Kg) | 7.0 |
| Molecular Weight (Mw) (Kg/mol) | 128 |

TABLE 2-continued

Block Composite Properties

| Property | BC B |
| --- | --- |
| Polydispersity Index (Mw/Mn) | 4.0 |
| Total Weight Percent $C_2$ | 46.9 |
| Melting Temperature (° C.) Peak 1 | 132 |
| Crystallization Temperature (° C.) | 91 |
| Melt Enthalpy (J/g) | 97 |
| Wt % iPP | 50 |
| Wt % EP | 50 |
| Wt % $C_2$ in EP | 90 |
| Block Composite Index | 0.707 |

EXAMPLES

Example 1

Comparative

Prepare five comparative samples [CS1-CS5] using the formulations provided in Table 3, below. The PBT in CS1 is employed as received. Comparative Samples CS2-CS5 are prepared by blending and extruding the components on an 18-mm, 48 L/D twin-screw extruder, operated at 600 rpm and 12 kg/hour throughput rate, and a temperature profile starting from the feeder barrel to the die as follows: 100° C./130° C./200° C./200° C./200° C./200° C./200° C.

TABLE 3

Compositions of CS1-CS5

| Component: | CS1 | CS2 | CS3 | CS4 | CS5 |
| --- | --- | --- | --- | --- | --- |
| PBT (wt %) | 100 | — | — | — | — |
| Polypropylene (wt %) | — | 99.335 | 83.335 | 83.335 | 83.335 |
| Olefin multi-block interpolymer (wt %) | — | — | 12 | — | — |
| Silane-grafted olefin multi-block interpolymer (wt %) | — | — | — | — | 12 |
| Silane-grafted polyolefin elastomer (wt %) | — | — | — | 12 | — |
| BC B (wt %) | — | — | 4 | 4 | 4 |
| DHT-4A (wt %) | — | 0.025 | 0.025 | 0.025 | 0.025 |
| NA-11A (wt %) | — | 0.14 | 0.14 | 0.14 | 0.14 |
| IRGANOX ™ 1010 (wt %) | — | 0.4 | 0.4 | 0.4 | 0.4 |
| IRGANOX ™ 168 (wt %) | — | 0.1 | 0.1 | 0.1 | 0.1 |

Analyze Comparative Samples CS1-CS5 according to the Test Methods described above. Results are provided in Table 4, below.

TABLE 4

Properties of CS1-CS5

| Property: | CS1 | CS2 | CS3 | CS4 | CS5 |
| --- | --- | --- | --- | --- | --- |
| Impact Strength, 23° C. (J/m) | 49.8 | 22.5 | 515.54 | 363.67 | 524.19 |
| Impact Strength, −23° C. (J/m) | 44.6 | 31.3 | 26.90 | 16.94 | 25.93 |
| Brittleness Temperature (° C.) | >20 | — | −17.0 | −7.0 | −22.0 |
| Tensile modulus, Secant 1% (MPa) | 3005 | 1749 | 1271 | 1315 | 1265 |
| Flexural (Young's) Modulus (MPa) | 2582 | 1878 | 1256 | 1121 | 1115 |
| Flexural Stress @ 3.5% strain (MPa) | 75.7 | 47.7 | 31.0 | 28.3 | 28.2 |
| Tensile Strength ("TS") @ Yield (MPa) | 55.9 | 40.5 | 30.5 | 30.7 | 30.4 |
| Tensile Elongation ("TE") @ Yield (%) | 3.51 | 7.53 | 11.4 | 12.5 | 13.5 |
| Heat deflection temp. @ 0.45 MPa (° C.) | 148 | 132.6 | 112.1 | 108.5 | 105.5 |
| Weight gain in LT-410A (%) | −0.31 | 4.53 | 10.52 | 11.10 | 10.50 |
| Weight gain in LT-390PP (%) | −0.01 | — | 4.62 | 5.21 | 4.83 |
| TS after 16 days in LT-410A (MPa) | 60.6 | 35.7 | 29.19 | 29.50 | 29.65 |
| TE @ Yield after 16 days in LT-410A (%) | 11.0 | 16.4 | 39.46 | 38.29 | 37.95 |
| Tensile modulus (Secant 1%) after 16 days in LT-410A (MPa) | 2601 | 1186 | 367.9 | 549.5 | 500.8 |
| TS after 16 days in LT-390PP (MPa) | 60.9 | — | 31.39 | 32.40 | 32.15 |
| TE @ Yield after 16 days in LT-390PP (%) | 10.5 | — | 27.35 | 27.91 | 27.97 |
| Tensile modulus (Secant 1%) after 16 days in LT-390PP (MPa) | 2767 | — | 1163.1 | 1060.0 | 1104.2 |

Example 2

Prepare two Samples (S1 and S2) using the formulations shown in Table 5, below. Samples S1 and S2 are prepared according to the procedure described in Example 1, above.

TABLE 5

Compositions of S1 and S2

| Component: | S1 | S2 |
| --- | --- | --- |
| Polypropylene (wt %) | 81.415 | 83.735 |
| Silane-grafted olefin multi-block interpolymer (wt %) | 12 | 10 |
| BC B (wt %) | 4 | 4 |
| DFDA-5480 (wt %) | 1.92 | 1.6 |
| DHT-4A (wt %) | 0.025 | 0.025 |
| NA-11A (wt %) | 0.14 | 0.14 |
| IRGANOX ™ 1010 (wt %) | 0.4 | 0.4 |
| IRGANOX ™ 168 (wt %) | 0.1 | 0.1 |

Analyze Samples S1 and S2 according to the Test Methods described above. Results are provided in Table 6, below.

TABLE 6

Properties of S1 and S2

| Property: | S1 | S2 |
|---|---|---|
| Impact Strength, 23° C. (J/m) | 306.43 | 167.9 |
| Impact Strength, −23° C. (J/m) | 51.08 | 51.4 |
| Brittleness Temperature (° C.) | −27.0 | −17.5 |
| Tensile modulus, Secant 1% (MPa) | 1344 | 1306 |
| Flexural (Young's) Modulus (MPa) | 1233 | 1270 |
| Flexural Stress @ 3.5% strain (MPa) | 30.7 | 29.5 |
| Tensile Strength ("TS") @ Yield (MPa) | 31.7 | 32.1 |
| Tensile Elongation ("TE") @ Yield (%) | 19.9 | 12.4 |
| Heat deflection temp. @ 0.45 MPa (° C.) | 119.2 | 119.4 |
| Weight gain in LT-410A (%) | 8.60 | 8.76 |
| Weight gain in LT-390PP (%) | 3.83 | — |
| TS after 16 days in LT-410A (MPa) | 31.78 | 29.67 |
| TE @ Yield after 16 days in LT-410A (%) | 32.70 | 31.98 |
| Tensile modulus (Secant 1%) after 16 days in LT-410A (MPa) | 346.6 | 557.2 |

As can be seen from the results in Table 6, the crosslinked impact-modifying polymer provides superior grease resistance, particularly compared to the corresponding non-crosslinked Comparative Sample CS5, while also maintaining improved impact strength and brittleness temperature compared to conventional materials such as CS1 and CS2.

Example 3

Prepare six Samples (S3-S8) using the formulations shown in Table 7, below. Samples S3-S8 are prepared according to the procedure described in Example 1, above.

TABLE 7

Compositions of S3-S8

| Component: | S3 | S4 | S5 | S6 | S7 | S8 |
|---|---|---|---|---|---|---|
| Polypropylene (wt %) | 94.695 | 87.735 | 81.935 | 70.335 | 64.535 | 41.335 |
| Silane-grafted olefin multi-block interpolymer (wt %) | 4 | 10 | 15 | 25 | 30 | 50 |
| DFDA-5480 (wt %) | 0.64 | 1.6 | 2.4 | 4 | 4.8 | 8 |
| DHT-4A (wt %) | 0.025 | 0.025 | 0.025 | 0.025 | 0.025 | 0.025 |
| NA-11A (wt %) | 0.14 | 0.14 | 0.14 | 0.14 | 0.14 | 0.14 |
| IRGANOX ™ 1010 (wt %) | 0.4 | 0.4 | 0.4 | 0.4 | 0.4 | 0.4 |
| IRGANOX ™ 168 (wt %) | 0.1 | 0.1 | 0.1 | 0.1 | 0.1 | 0.1 |

Analyze Samples S3-S8 according to the Test Methods described above. Results are provided in Table 8, below.

TABLE 8

Properties of S3-S8

| Property: | S3 | S4 | S5 | S6 | S7 | S8 |
|---|---|---|---|---|---|---|
| Impact Strength, 23° C. (J/m) | 59.8 | 210.4 | 566.8 | 689.7 | 672.0 | 509.7 |
| Impact Strength, −23° C. (J/m) | 23.2 | 47.9 | 81.1 | 249.5 | 452.3 | 716.8 |
| Brittleness Temperature (° C.) | 2.5 | −17.5 | −32.5 | <−30 | <−30 | <−30 |
| Tensile modulus, Secant 1% (MPa) | 1364 | 1372 | 1148 | 867 | 755 | 425 |
| Flexural (Young's) Modulus (MPa) | 1428 | 1319 | 1133 | 851 | 688 | 290 |
| Flexural Stress @ 3.5% strain (MPa) | 37.0 | 31.1 | 22.8 | 19.1 | 15.7 | 6.6 |
| Tensile Strength ("TS") @ Yield (MPa) | 35.7 | 33.4 | 29.9 | 24.6 | 23.0 | 22.4 |
| Tensile Elongation ("TE") @ Yield (%) | 9.2 | 12.3 | 19.6 | 27.1 | 33.2 | 197.6 |
| Heat deflection temp. @ 0.45 MPa (° C.) | 132.5 | 129.0 | 117.3 | 108.1 | 100.0 | 77.7 |
| Weight gain in LT-410A (%) | 7.28 | 8.36 | 10.64 | 15.91 | 18.28 | 33.59 |
| TS after 16 days in LT-410A (MPa) | 32.2 | 30.3 | 27.1 | 21.8 | 26.5 | 15.5 |
| TE @ Yield after 16 days in LT-410A (%) | 21.5 | 30.9 | 39.8 | 61.7 | 276.7 | 111.0 |
| Tensile modulus (Secant 1%) after 16 days in LT-410A (MPa) | 881.4 | 557.4 | 460.4 | 263.9 | 226.4 | 111.8 |

As can be seen from the results in Table 8, the crosslinked impact-modifying polymer provides superior grease resistance at lower concentrations, particularly compared to the corresponding non-crosslinked comparative sample CS5, even without using a di-block compatibilizer as in Example 2. Additionally, Samples S3-S8 also maintained improved impact strength and brittleness temperature compared to conventional materials such as CS1 and CS2. However, at higher concentrations of the impact-modifying polymer (25 to 50 wt %), decreases in tensile and flexural modulus are observed.

Example 4

Prepare three Samples (S9-S11) using the formulations shown in Table 9, below. Samples S9-S11 are prepared according to the procedure described in Example 1, above.

TABLE 9

Compositions of S9-S11

| Component: | S9 | S10 | S11 |
|---|---|---|---|
| Polypropylene (wt %) | 81.415 | 77.935 | 66.335 |
| Silane-grafted polyolefin elastomer (wt %) | 12 | 15 | 25 |
| BC B (wt %) | 4 | 4 | 4 |
| DFDA-5480 (wt %) | 1.92 | 2.4 | 4 |
| DHT-4A (wt %) | 0.025 | 0.025 | 0.025 |
| NA-11A (wt %) | 0.14 | 0.14 | 0.14 |
| IRGANOX ™ 1010 (wt %) | 0.4 | 0.4 | 0.4 |
| IRGANOX ™ 168 (wt %) | 0.1 | 0.1 | 0.1 |

Analyze Samples S9-S11 according to the Test Methods described above. Results are provided in Table 10, below.

TABLE 10

Properties of S9-S11

| Property: | S9 | S10 | S11 |
|---|---|---|---|
| Impact Strength, 23° C. (J/m) | 624.49 | 371.6 | 666.3 |
| Impact Strength, −23° C. (J/m) | 41.01 | 44.2 | 78.5 |
| Brittleness Temperature (° C.) | — | −22.5 | <−30 |
| Tensile modulus, Secant 1% (MPa) | 1435 | 1235 | 955 |
| Flexural (Young's) Modulus (MPa) | 1289 | 1135 | 938 |
| Flexural Stress @ 3.5% strain (MPa) | 32.6 | 26.2 | 19.1 |
| Tensile Strength ("TS") @ Yield (MPa) | 32.5 | 30.3 | 25.8 |
| Tensile Elongation ("TE") @ Yield (%) | 16.4 | 12.1 | 19.0 |
| Heat deflection temp. @ 0.45 MPa (° C.) | 121.0 | 113.5 | 102.5 |
| Weight gain in LT-410A (%) | 9.44 | 11.77 | 18.18 |
| Weight gain in LT-390PP (%) | 4.07 | — | — |
| TS after 16 days in LT-410A (MPa) | 29.98 | 25.91 | 20.77 |
| TE @ Yield after 16 days in LT-410A (%) | 34.01 | 40.78 | 56.96 |
| Tensile modulus (Secant 1%) after 16 days in LT-410A (MPa) | 499.6 | 432.11 | 283.74 |

As can be seen from the results in Table 10, the crosslinked impact-modifying polymer provides superior grease resistance, particularly compared to the corresponding non-crosslinked comparative sample CS4 (compare S9 to CS4), while also maintaining improved impact strength and brittleness temperature compared to conventional materials such as CS1 and CS2. However, at higher concentrations of the impact-modifying polymer (25 wt %), decreases in tensile and flexural modulus are observed.

Example 5

Prepare two Samples (S12 and S13) using the formulations shown in Table 11, below. Samples S12 and S13 are prepared according to the procedure described in Example 1, above.

TABLE 11

Compositions of S12 and S13

| Component: | S12 | S13 |
|---|---|---|
| Polypropylene (wt %) | 81.935 | 70.335 |
| Silane-grafted polyolefin elastomer (wt %) | 15 | 25 |
| DFDA-5480 (wt %) | 2.4 | 4 |
| DHT-4A (wt %) | 0.025 | 0.025 |
| NA-11A (wt %) | 0.14 | 0.14 |
| IRGANOX ™ 1010 (wt %) | 0.4 | 0.4 |
| IRGANOX ™ 168 (wt %) | 0.1 | 0.1 |

Analyze Samples S12 and S13 according to the Test Methods described above. Results are provided in Table 12, below.

TABLE 12

Properties of S12 and S13

| Property: | S12 | S13 |
|---|---|---|
| Impact Strength, 23° C. (J/m) | 145.4 | 362.9 |
| Impact Strength, −23° C. (J/m) | 41.3 | 64.1 |
| Brittleness Temperature (° C.) | −12.5 | −22.5 |
| Tensile modulus, Secant 1% (MPa) | 1213 | 964 |
| Flexural (Young's) Modulus (MPa) | 1174 | 889 |
| Flexural Stress @ 3.5% strain (MPa) | 27.3 | 20.4 |
| Tensile Strength ("TS") @ Yield (MPa) | 30.9 | 26.4 |
| Tensile Elongation ("TE") @ Yield (%) | 11.8 | 18.8 |
| Heat deflection temp. @ 0.45 MPa (° C.) | 118.6 | 117.6 |
| Weight gain in LT-410A (%) | 11.42 | 18.74 |
| TS after 16 days in LT-410A (MPa) | 26.4 | 24.1 |
| TE @ Yield after 16 days in LT-410A (%) | 40.0 | 52.4 |
| Tensile modulus (Secant 1%) after 16 days in LT-410A (MPa) | 467.2 | 319.6 |

As can be seen from the results in Table 12, the crosslinked impact-modifying polymer provides improved impact strength and brittleness temperature compared to conventional materials such as CS1 and CS2. S12 and S13 even provide comparable grease resistance without using a di-block compatibilizer as in Example 4. However, at higher concentrations of the impact-modifying polymer (25 wt %), decreases in tensile and flexural modulus are observed.

The invention claimed is:

1. An extruded optical cable protective component comprising:
    an extruded polymeric blend, comprising:
        (a) a crystalline polypropylene having a crystallinity of at least 55 percent; and
        (b) a crosslinked impact-modifying polymer,
        wherein said crosslinked impact-modifying polymer is an elastomer selected from the group consisting of a crosslinked silane-functionalized elastomer, a crosslinked maleic-anhydride-functionalized elastomer, or combinations thereof.

2. The extruded optical cable protective component of claim 1, wherein said crystalline polypropylene is present in an amount ranging from 45 to 95 weight percent based on the entire polymeric blend weight; wherein said crosslinked impact-modifying polymer is present in an amount ranging from 4 to 50 weight percent based on the entire polymeric blend weight.

3. The extruded optical cable protective component of claim 1, wherein said elastomer of said crosslinked impact-modifying polymer is selected from the group consisting of polyolefin elastomers, olefin multi-block interpolymers, olefin block composites, and combinations of two or more thereof.

4. The extruded optical cable protective component of claim 1, further comprising a non-crosslinked elastomer component selected from the group consisting of olefin elastomers, non-olefin elastomers, olefin multi-block interpolymers, olefin block composites, and mixtures of two or more thereof.

5. The extruded optical cable protective component of claim 1, wherein said polymeric blend has a weight gain after 16 days in LT-410A of less than 10 percent.

6. The extruded optical cable protective component of claim 1, wherein said polypropylene has a melt flow index ($I_2$) in the range of from 1 to 20 grams eluted per 10 minutes, wherein said polymeric blend has a notched Izod impact strength at 23° C. of at least 100 Joule per meter ("J/m"); wherein said polymeric blend has a 1-perent secant modulus at 23° C. of at least 1,200 megapascals ("MPa").

7. The extruded optical cable protective component of claim 1, further comprising one or more additional components selected from the group consisting of antioxidants, stabilizers, nucleating agents, acid scavengers, fillers, and combinations of two or more thereof.

8. An optical fiber cable, comprising:
(a) the extruded optical fiber cable protective component of claim 1; and
(b) at least one optical fiber transmission medium.

9. A polymeric blend, comprising:
(a) a crystalline polypropylene having a crystallinity of at least about 55 percent;
(b) an impact-modifying polymer selected from the group consisting of a silane-grafted polyolefin elastomer, a silane-grafted olefin multi-block interpolymer, a silane-grafted olefin block composite, and combinations of two or more thereof;
(c) a non-silane-grafted elastomer selected from the group consisting of an olefin multi-block interpolymer, an olefin block composite, and combinations thereof; and
(d) a condensation catalyst.

10. The polymeric blend of claim 9, wherein said crystalline polypropylene is present in said polymeric blend in an amount ranging from 50 to 90 wt % based on the entire polymeric blend weight; wherein said impact-modifying polymer is present in said polymeric blend in an amount ranging from 4 to 45 wt % based on the entire polymeric blend weight; wherein said non-silane-grafted compatibilizer is present in said polymeric blend in an amount ranging from 1 to 10 wt % based on the entire polymeric blend weight; wherein said condensation catalyst is present in said polymeric blend in an amount ranging from 0.01 to 0.5 wt % based on the entire polymeric blend weight.

* * * * *